United States Patent
Childress et al.

(10) Patent No.: US 9,985,941 B2
(45) Date of Patent: *May 29, 2018

(54) PASSWORD MANAGEMENT SYSTEM

(71) Applicant: International Business Machines Corporation, Armonk, NY (US)

(72) Inventors: Rhonda L. Childress, Austin, TX (US); Itzhack Goldberg, Hadera (IL); Clifford A. Pickover, Yorktown Heights, NY (US); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/847,047

(22) Filed: Sep. 8, 2015

(65) Prior Publication Data

US 2017/0068814 A1 Mar. 9, 2017

(51) Int. Cl.
*H04L 29/06* (2006.01)
*H04L 9/32* (2006.01)
(Continued)

(52) U.S. Cl.
CPC ............ *H04L 63/062* (2013.01); *G06F 21/31* (2013.01); *G06F 21/45* (2013.01); *G06F 21/46* (2013.01);
(Continued)

(58) Field of Classification Search
CPC ....... G06F 21/36; G06F 21/31; H04L 63/083; H04L 9/3226
(Continued)

(56) References Cited

U.S. PATENT DOCUMENTS 6,643,784 B1 11/2003 McCulligh
7,966,649 B1 6/2011 Cooper
(Continued)

FOREIGN PATENT DOCUMENTS

WO 03/038569 A3 5/2003

OTHER PUBLICATIONS

US 2015/0089609 A1, 03/2015, Juels (withdrawn)
(Continued)

*Primary Examiner* — Alexander Lagor
(74) *Attorney, Agent, or Firm* — Erik K. Johnson

(57) ABSTRACT

An embodiment of the invention may include a method, computer program product and computer system for password management. The embodiment may include a computing device that creates a password inventory. The password inventory may be a list of one or more passwords, where each of the one or more passwords corresponds to a password key. The embodiment may update the password inventory without input from a user. The embodiment may receive a first login request from a first device. The embodiment may transmit information detailing a first password key to the first device, where the first password key corresponds to a first password from the list of one or more passwords. The embodiment may receive information detailing a first entered password from the first device. The embodiment may determine whether the first entered password is identical to the first password from the list of one or more passwords.

20 Claims, 6 Drawing Sheets

| Password | Key |
|----------|-----|
| abcde1234 | d |
| bcdef2345 | e |
| cdefg3456 | f |
| defgh4567 | g |
| efghi5678 | h |
| fghij6789 | i |
| ghija7891 | j |

(51) Int. Cl.
*G06F 21/00* (2013.01)
*H04W 12/04* (2009.01)
*G06F 21/45* (2013.01)
*G06F 21/31* (2013.01)
*G06F 21/46* (2013.01)

(52) U.S. Cl.
CPC ............ *H04L 63/06* (2013.01); *H04L 63/083* (2013.01); *H04L 63/1466* (2013.01); *H04L 63/20* (2013.01); *H04W 12/04* (2013.01); *G06F 2221/2115* (2013.01)

(58) Field of Classification Search
USPC ................... 726/4–6; 713/182–184; 709/225
See application file for complete search history.

(56) References Cited

U.S. PATENT DOCUMENTS

| | | |
|---|---|---|
| 8,286,000 B2 | 10/2012 | Vedula et al. |
| 8,468,598 B2 | 6/2013 | Hebert |
| 9,230,092 B1 | 1/2016 | Juels |
| 2008/0147821 A1 | 6/2008 | Dietrich et al. |
| 2010/0125906 A1 | 5/2010 | Golle et al. |
| 2011/0010763 A1 | 1/2011 | Beardslee |
| 2012/0297465 A1 | 11/2012 | Wang |
| 2013/0046973 A1 | 2/2013 | Resch et al. |
| 2013/0145447 A1 | 6/2013 | Maron |
| 2013/0219473 A1 | 8/2013 | Schaefer |
| 2013/0254856 A1 | 9/2013 | Krishan |
| 2015/0121489 A1 | 4/2015 | Yang et al. |
| 2015/0128234 A1* | 5/2015 | Xavier ................ H04L 63/0869 726/6 |
| 2015/0281216 A1 | 10/2015 | Donohue |
| 2016/0337334 A1* | 11/2016 | Murr ..................... H04W 12/06 |

OTHER PUBLICATIONS

IBM: List of IBM Patents or Patent Applications Treated as Related (Appendix P), Jan. 26, 2017, pp. 1-2.
Pending U.S. Appl. No. 15/275,536, filed Sep. 26, 2016, entitled: "Password Management System", pp. 1-29.
Pending U.S. Appl. No. 15/275,540, filed Sep. 26, 2016, entitled: "Password Management System", pp. 1-29.
Accelerated Examination Support Document, U.S. Appl. No. 15/044,357, signed Feb. 12, 2016, 8 pages.
Childress et al., "Password Management System," U.S. Appl. No. 15/044,357, filed Feb. 16, 2016.
List of IBM Patents or Patent Applications Treated as Related, signed Feb. 16, 2016, 2 pgs.

* cited by examiner

| Password | Key |
|---|---|
| abcdeDOG11 | 5 |
| cbcdegOG15 | 7 |
| fbcdeDhG11 | 4 |
| gbcdeDhG13 | 2 |
| hbcdeDiG11 | k |

FIG. 4a

| Password | Key |
|---|---|
| abcdeDOG11 | L |
| cbcdegOG15 | 5 |
| fbcdeDhG11 | y |
| gbcdeDhG13 | 6 |
| hbcdeDiG11 | 9 |

FIG. 4b

| Password | Key |
|---|---|
| abcde1234 | d |
| bcdef2345 | e |
| cdefg3456 | f |
| defgh4567 | g |
| efghi5678 | h |
| fghij6789 | i |
| ghija7891 | j |

FIG. 4c

| Password | Key |
|---|---|
| abcde1234 | 4 |
| bcdef2345 | 5 |
| cdefg3456 | 6 |
| defgh4567 | 7 |
| efghi5678 | 8 |
| fghij6789 | 9 |
| ghija7891 | 1 |

FIG. 4d

| Password | Key |
|----------|-----|
| a1t | 1 |
| f4& | 2 |
| qb4 | 3 |
| l5k | 4 |
| tr8 | 5 |
| v90 | 6 |
| 9rg | 7 |

FIG. 4e

| Password | Key |
|----------|-----|
| 9rg | 1 |
| qb4 | 2 |
| tr8 | 3 |
| v90 | 4 |
| a1t | 5 |
| l5k | 6 |
| f4& | 7 |

FIG. 4f

PASSWORD MANAGEMENT SYSTEM

BACKGROUND

The present invention relates to a password management system, and more particularly to a system that creates/stores passwords for user authentication.

A password is a word or string of characters used for user authentication to prove identity or access approval to gain access to a resource, which should be kept secret from those not allowed access. In modern computing systems, passwords are generally used to allow a user to access secure, private, information that is not accessible to the public, such as banking and financial records, health records, e-mail, etc.

In the field of computer security, many techniques exist for authenticating or otherwise securing user access to a computer or to a specific computing resource. In particular, it is well-known to associate a user with a confidential password, usually in conjunction with a log-in name or other identifier that is also associated with the user, and to then require entry of the appropriate identifier/password combination before granting access to a requested computer or computing resource.

Ideally, only the user or an authorized agent of the user will have knowledge of the password required to gain access to the computer or computing resource in question. In practice, however, it may be possible for unauthorized actors to obtain the required password, and thereby to gain elicit access to the computer or computing resource in question.

For example, a user may obtain a password for accessing a computing resource. At a later time, an unauthorized user may attempt to guess or otherwise determine the password in question. For example, the unauthorized user may utilize well-known techniques for attempting to determine a desired password. In another example, such techniques may involve "brute force" techniques, in which different combinations of characters or symbols (e.g., letters or numbers) are selected and attempted repetitively, either at random or in a specified manner, until if and when the actual correct password is selected and attempted.

In order to prevent a success of these and various other known techniques for illicitly determining a desired password, authorized users in the process of password creation may be advised, requested, or required to select a password that is thought to be relatively unsusceptible to determination by such techniques. Such passwords may generally be referred to as "strong" passwords, where, in this context, the strength of a password may generally be understood as being inversely proportional to the susceptibility to the types of password determination techniques referenced above. That is, stronger passwords, by definition, are less susceptible to one or more password-determination techniques. Known metrics exist for measuring password strength, which may consider, for example, inclusion of non-alphanumeric characters, mixing of different types of characters (e.g., letter and numbers), a length of time that a given password has been in use, and other factors which are thought to influence password susceptibility (e.g., factors which influence a likelihood of determining a password, or which influence a quantity of time and/or computing resources needed to determine a password).

However, such measures of password strength may vary, e.g., depending on the type of password determination technique that is being used. Moreover, it may be difficult or inconvenient for users to create and utilize passwords having required levels of strength, or otherwise to maintain their passwords in a way which minimizes susceptibility to determination thereof by potential unauthorized users. Consequently, although reliance on password-based protection schemes remain prevalent throughout the field of computer security, it is often the case that the actual protection provided thereby may be inadequate, and may provide a relative point of weakness in providing secured user access.

BRIEF SUMMARY

An embodiment of the invention may include a method, computer program product and computer system for password management. The embodiment may include a computing device that creates a password inventory. The password inventory may be a list of one or more passwords, where each of the one or more passwords corresponds to a password key. The embodiment may update the password inventory without input from a user. Updating the password inventory may be one or more of: issuing a new password key to each password; and issuing a new password to each password key. The embodiment may receive a first login request from a first device. The embodiment may transmit information detailing a first password key to the first device, where the first password key corresponds to a first password from the list of one or more passwords. The embodiment may receive information detailing a first entered password from the first device. The embodiment may determine whether the first entered password is identical to the first password from the list of one or more passwords.

BRIEF DESCRIPTION OF THE SEVERAL DRAWINGS

FIGS. 4a-4f depict example embodiments of a password inventory, in accordance with an embodiment of the invention.

DETAILED DESCRIPTION

Embodiments of the present invention will now be described in detail with reference to the accompanying Figures.

As devices become more ubiquitous and ever present in people's lives, user authentication programs may rely on a user's ability to access such programs in order to authenticate the identity of a user and to grant the user access to secure information, services or programs, or enable that user to conduct secure transactions. By tying a device into authentication processes, specifically a device that is known to belong and be controlled by a specific user that has access to secure information, services or applications, extra levels of security may be obtained. In embodiments described below, a method uses multiple passwords sent to a device controlled by a specific user, where each password has an associated password key, and a login request contains the password key in order to prompt the specific user to enter the password associated with the password key. This additional call and request (i.e. the password key and associated password) beyond the traditional username and password may create a regime where a breach of a single password (e.g. using a key logger, stealing through unsecure wi-fi, looking over a user's shoulder when they enter the password) would not enable an unwanted user to erroneously authenticate themselves as the specific user. Further, such a method may take advantage of the portability of devices controlled by a user to replace or reorder the list of multiple passwords in the possibility of a breach.

Additionally, the embodiments described below may reduce liability for services that rely on user authentication prior to granting access to information or services located on their devices. This may be obtained either through moving the authentication of a specific user to a third party, where the third party controls the authentication process, and/or through the use of multiple passwords that require additional information (i.e. password key and password inventory) to gain access to the secure information, services or programs. In one example, this may mitigate damage caused by a large scale breach of passwords on a company's website leading to security vulnerabilities for all of the users of that website due to user's having repetitive usernames and passwords across the internet.

Figure 1:
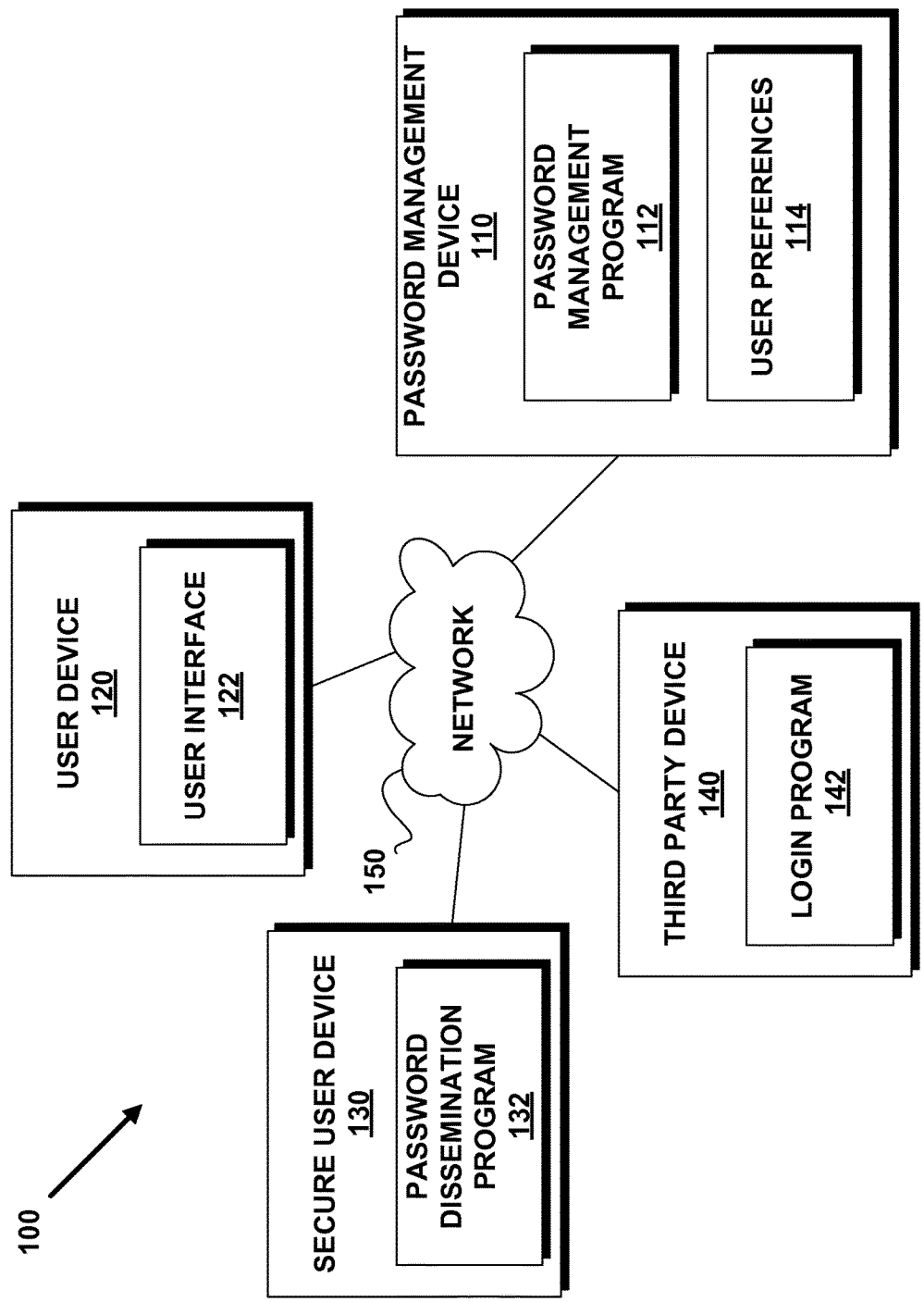
FIG. 1 illustrates a password management system, in accordance with an embodiment of the invention.

FIG. 1 illustrates password management system 100, in accordance with an embodiment of the invention. In an example embodiment, password management system 100 includes a password management device 110, a user device 120, a secure user device 130 and a third party device 140 interconnected via a network 150. While FIG. 1 illustrates 4 discrete devices in password management system 100, other arrangements may be contemplated (e.g. user devices 120 and secure user device 130 may be the same device, password management device 110 and third party device 140 may be the same device).

Network 150 may include, for example, wired, wireless or fiber optic connections. In other embodiments, network 150 may be implemented as an intranet, a local area network (LAN), or a wide area network (WAN). In general, network 150 can be any combination of connections and protocols that will support communications between the password management device 110, the user device 120, the secure user device 130 and the third party device 140. In the example embodiment, network 150 is the Internet, representing a worldwide collection of networks and gateways to support communications between devices connected to the Internet.

User device 120 includes user interface 122. In the example embodiment, user device 120 is a desktop computer, a notebook or a laptop computer; however, in other embodiments, user device 120 may be a smart phone, a tablet computer, a handheld device, a thin client, or any other electronic device or computing system capable of receiving and sending data to and from third party device 140 via network 150 and capable of communicating with the user to be authenticated. User device 120 is described in more detail with reference to FIG. 3.

User interface 122 includes components used to receive input from a user and transmit the input to an application residing on user device 120 or third party device 140. In an example embodiment, user interface 122 uses a combination of technologies and devices, such as device drivers, to provide a platform to enable users of user device 120 to interact with login program 142. In the example embodiment, user interface 122 receives input, such as textual input received from a physical input device, such as a keyboard, via a device driver that corresponds to the physical input device.

Secure user device 130 includes a password dissemination program 132. Secure user device 130 may be a desktop computer, a notebook or a laptop computer, a smart phone, a cell phone, a tablet computer, a handheld device, or any other electronic device or computing system capable of securely sending and receiving to and from password management device 110 via network 150, and communicating that information with the specific user. The secure user device 130 may be any device that is known to be associated with the specific user. In an example embodiment, secure user device 130 may be any device which the specific user would have on their body, or near their body, at most points in time such as, for example, a cell phone, a smart phone, a smart watch, wearable technology and implantable technology. In an example embodiment, secure user device 130 may have additional protection, such as password protection or biometric recognition, to restrict access to the secure user device 130 to the specific user. Secure user device 130 is described in more detail with reference to FIG. 3.

Password dissemination program 132 is a program located on secure user device 130 that communicates a password inventory, which contains at least a list of passwords, and may additionally contain a password key associated with each password, to the specific user. In some embodiments, password dissemination program 132 may contain barriers, such as password protection or biometric recognition, which restrict unauthorized access to the password dissemination program 132. Example embodiments of the password dissemination program 132 include an app located on a smart phone, an SMS messaging service on a cell phone, a program on a desktop or laptop, and a messaging service located on a wearable (e.g. a fitbit). Password dissemination program 132 may relay the list passwords or password inventory to the specific user using audio, visual, tactile or any other means of communication.

Third party device 140 includes a login program 142. Third party device 140 may be any device capable of storing information, performing services or running applications. Third party device 140 may be a desktop computer, a notebook, a laptop computer, a tablet computer, a handheld device, a smart-phone, a thin client, or any other electronic device or computing system capable of receiving and sending data to and from other computing devices such as user device 120 and password management device 110 via network 150. Although not shown, optionally, third party device 140 can comprise a cluster of web servers executing the same software to collectively process the requests for the web pages as distributed by a front end server and a load balancer. In an example embodiment, third party device 140 is a computing device that is optimized for the support of websites or other secure information, services or applications that resides on third party device 140, and uses login program 142 to authenticate a user to be authenticated as the specific user. Third party device 140 is described in more detail with reference to FIG. 3.

Login program 142 may be a program, or subroutine contained in a program, that communicates with the user to be authenticated using a user interface 122, located on user device 120, and password management program 112, located on password management device 110. The login program 142 displays a single password key, or a string of password keys, and prompts the user to be authenticated to enter the password associated with the password key to attempt to validate their identity as the specific user. In a preferred embodiment, the password key is a character, word, or phrase that relates to a specific password from the password list. The login program 142 sends the password entered by the user to the password management program 112, and subsequently receives a response from the password management program on whether the password is valid. Once the password has been validated, login program 142 grants the user to be authenticated access (the user becomes an authenticated user) to the information, services or applications located on third party device 140.

Password management device 110 includes a password management program 112 and user preferences 114. Password management device 110 may be a desktop computer, a notebook, a laptop computer, a tablet computer, a handheld device, a smart-phone, a thin client, or any other electronic device or computing system capable of receiving and sending data to and from other computing devices such as secure user device 130, user device 120 and password management device 110 via network 150. Password management device 110 is described in more detail with reference to FIG. 3.

User preferences 114 contains information that details preferred settings pertaining to password management program 112. In an embodiment, user preferences 114 may contain a set of user generated passwords, and optionally user generated password keys. In additional embodiments, user preferences 114 may contain information related to communication preferences, device preferences, how often a password inventory is generated, how often a password inventory is reordered, how often the password keys are reissued, the number of passwords in a password inventory, complexity of passwords, rules for password keys, how long a validated login maintains a connection to the information, services or applications on the third party device 140, how many invalid passwords cause a warning, reshuffle of the password inventory or reissue of a password inventory, and what types of actions occur during password misuse.

Password management program 112 validates that the user to be authenticated is the specific user when the user to be authenticated attempts to gain access to information, services or applications located on a third party device 140. Password management program 112 may generate a password inventory, where each password has an associated password key, and distribute that password inventory to the secure user device 120. The password management program 112 may reorder or replace the password inventory. The password management program 112 may receive a request to login to a third party device 140, from login program 142, and send a password key to the login program 142. The password key may be any indicator that allows the specific user to determine which password from the password inventory is correct. In an example embodiment, a password key may be the numeric position of where the password is located in the list (e.g. third password in list). In another embodiment, the password key may be related to a characteristic of the password (e.g. the eighth character of the password, a word located in the password). In an additional embodiment, the password key may be an unrelated code or phrase that is assigned to each password and distributed with the password inventory. The password management program 112 would then receive the password from the login program 142, and return a password validation to the login program 142 if the password matched the password associated with the previously sent password key. Password management program 112 is described in more detail below, with reference to FIGS. 2a and 2b.

Figure 2A:
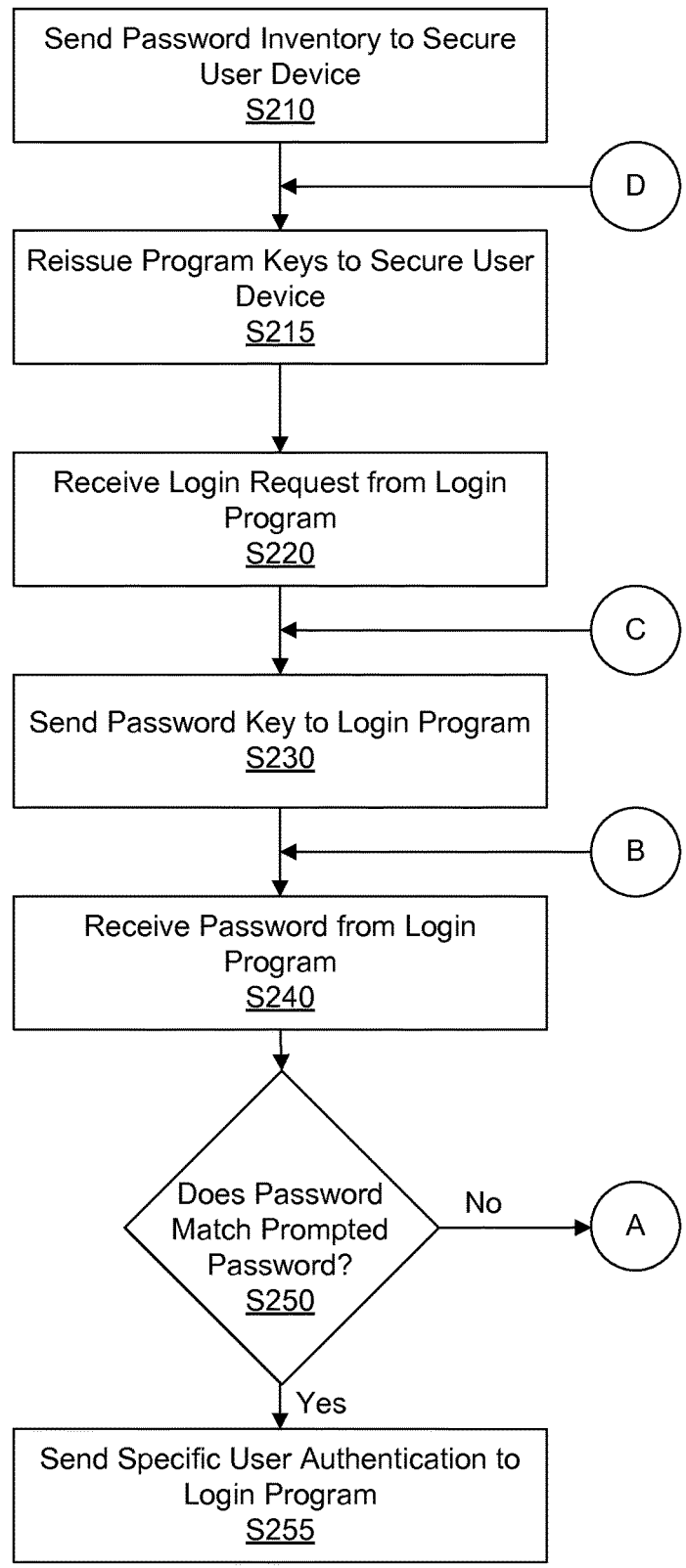
FIG. 2a-2b is a flowchart illustrating the operations of the password management program of FIG. 1 in determining what document to display based on a shortcut input, in accordance with an embodiment of the invention.
Figure 2B:
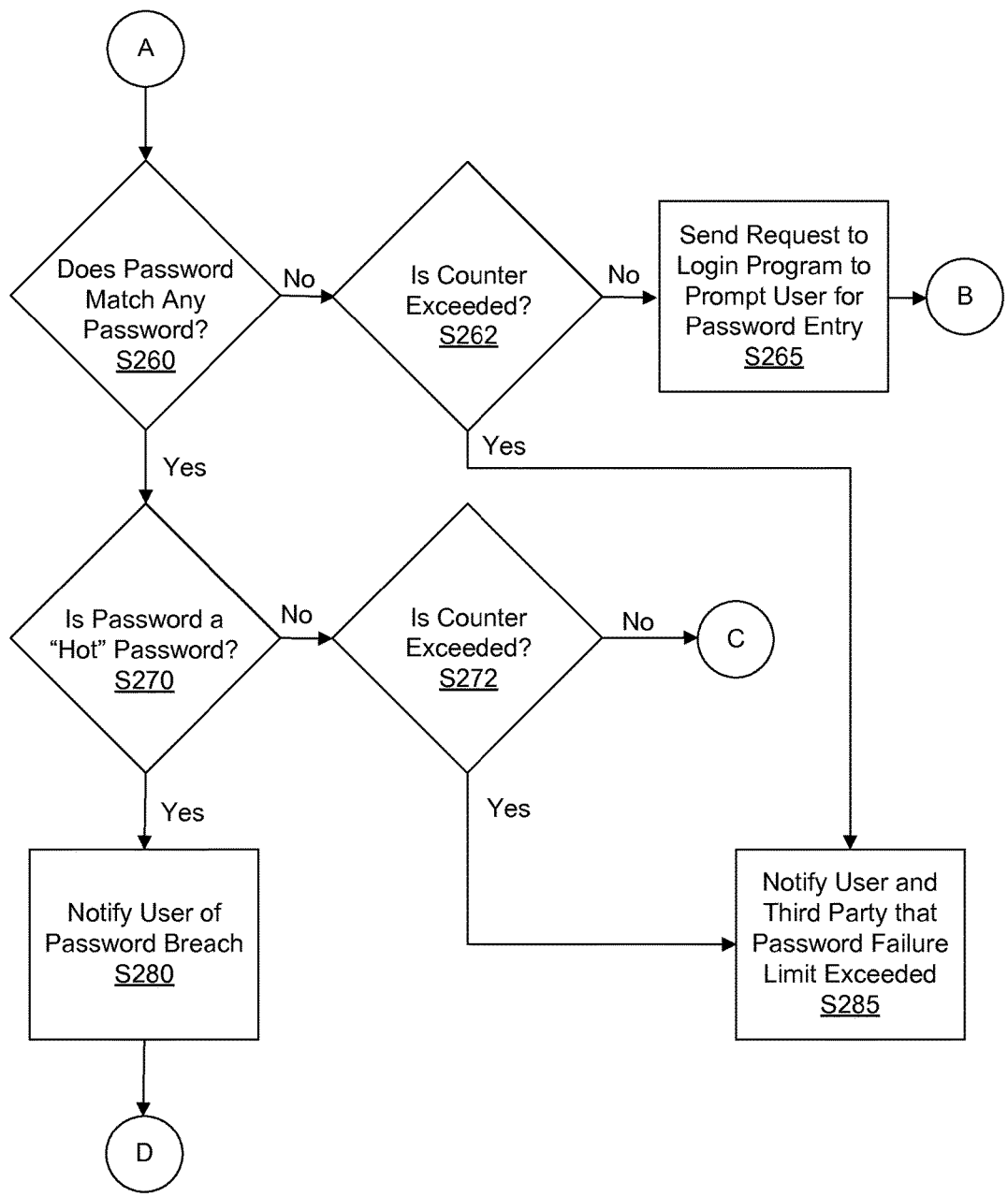

FIGS. 2a and 2b are a flow chart illustrating the password management program 112. Referring to step S210, password management program 112 creates a password inventory and sends the password inventory to the secure user device 130. The password inventory may be a list of passwords (or password list), and a list of password keys, where each password key corresponds to one of the passwords from the list of passwords. The password list and the password key may be, in whole or in part, created by the specific user, and/or created by the password management program 112, as described in more detail below. The password inventory may be created when the number of valid passwords in the password list drops below a threshold value, as defined in the user preferences 114.

To create a password inventory, password management program 112 generates multiple passwords to form a password list, where the number and complexity of passwords adhere to the criterion contained in user preferences 114. Passwords may be randomly generated strings of characters, or may adhere to known methods of password generation, such as those found in U.S. Pat. No. 8,286,000, which are incorporated herein by reference. Password keys may be any cue that could be given to the user to be authenticated that could provide information such as characters, words, colors and/or sounds. Further, the password keys in the password inventory may be an ordered list, may be randomly assigned, may be based on a user defined rule that creates the password key from a portion of the password, or may be user defined password keys corresponding to specific positions in the password list. In embodiments where the password key is based on user defined criteria located in user preferences 114, password management program 112 creates a password list where there would not be duplicate password keys (see the example in FIG. 4c, and described below).

Additionally, the password inventory may contain dummy passwords that are intended not to be used, or dummy passwords that are associated with the real passwords, but not distributed to the specific user, similar to methods contained in U.S. Pat. No. 8,468,598, which are incorporated here by reference.

Once the password inventory is created, some or all of the password inventory may be sent to the secure user device 130. The portion of the password inventory sent to the secure user device 130 may depend on information the specific user already knows, based on user preferences 114. For example, if the specific user entered the passwords to be used into user preferences 114, the program management program 112 may send the specific user a string of keys, as described further below with regards to FIGS. 4a and 4b.

After sending a newly created password inventory to the secure user device 130, password management program 112 may not replace the previously used password inventory until it receives confirmation that the specific user has received the newly created password inventory. This may enable the specific user to continue to login to the third party device 140 if secure user device 130 cannot connect to the internet.

Referring to step S215, password management program 112 reissues the program keys, and sends the reissued program keys to the secure user device 130. Reissuance of program keys may include reordering a list of passwords, recreating password keys, or altering criterion used to determine the password key. The reissuance of program keys may be based on criterion contained in user preferences 114 such as, for example, after a certain period of time (e.g. 4 hours), after a certain number of logins, after a certain number of login failures, etc. After sending the reissued program keys to the secure user device 130, password management program 112 may not replace the previously created program keys in the password until it receives confirmation that the specific user has received the reissued program keys. This may enable the specific user to continue to login to the third party device 140 if secure user device 130 cannot connect to the internet.

FIGS. 4a and 4b is an example embodiment of a password inventory from step S210, and an associated reissuance of the password keys from step S215, respectively. FIGS. 4a and 4b represent an embodiment in which both the passwords and password keys are randomly created. During step S210, the entire password inventory (both lists of FIG. 4a) would be sent to the secure user device 130, in order for the specific user to reference the list when provided with the password key during a login attempt, which is described in more detail below. The password list and password keys may be sent to the secure user device 130 together, or independently. In instances where the password list and password key are sent independently, the password list and password key are arranged in a manner predetermined by the user, such as, for example, each are sent in a relational order (password list: abcdeDOG11, cbcdegOG15, fbcdeDhG11, gbcdeDhG13, hbcdeDiG11; password keys: 5, 7, 4, 2, k). During step S215, when a reissue of the password key is performed, each password key is randomly created and assigned to a specific password, as show in FIG. 4b. Sending the reissued password key to the secure user device 130 may include sending the entire password inventory, or only the password keys which are arranged in the predetermined manner used during step S210.

FIGS. 4c and 4d is an example embodiment of a password inventory from step S210, and an associated reissuance of the password keys from step S215, respectively. FIGS. 4c and 4d represent an embodiment in which the specific user defines a criterion to create the password key based on an aspect of each password. In this example, the password key is created from a character in a specific position of the password, such as the $4^{th}$ character in FIG. 4c. In such an embodiment, during step S210, the password management program 112 may only send the password list, and a reference key, corresponding to which character of the password is the password key. In this example, the password management program 112 may send the number 4 to the secure user device 130 to inform the specific user that the $4^{th}$ character is the password key, however further obfuscation of the reference key is contemplated (e.g. reference key=character location—2). During the reissue of the password key in step S215, the password inventory of FIG. 4d may be created. In the current example, the password management program 112 may communicate the reissued password keys by sending the number 9.

FIGS. 4e and 4f is an example embodiment of a password inventory from step S210, and an associated reissuance of the password keys from step S215, respectively. FIGS. 4e and 4f represent an embodiment in which the password list contains portions of a to-be-completed password, and the password key represents the position of the password in the list. In the current example in FIG. 4e, the password to be entered would be a combination of passwords from the password list, and a complete password would be represented by a combination of password keys. For example, if the combination of password keys is 246, then the complete password would be f4&v9015k. During the reissue of the password key in step S215, the password inventory of FIG. 4f would be created. The reissued password keys may be communicated to the specific user by sending the re-ordered password list (i.e. 9rg, qb4, tr8, v90, alt, 15k, f4&) to the secure user device 130. In alternative embodiments where the specific user has the password list committed to memory (e.g. the specific user created the password list), the specific user may be sent the keys corresponding to the order of the passwords (i.e. 5726341).

Referring to step S220, password management program 112 receives a request to authenticate the user to be authenticated as the specific user. The login request is a request to grant the user to be authenticated access to the secure information, services or applications located on third party device 140 that are associated with the specific user. Such a request may be initiated by the login program 142 when the user to be authenticated provides identifying information to the login program 142, such as a user name, which is relayed to the password management program 112 along with the login request.

Referring to step S230, password management program 112 sends a password key to the login program 142. When password management program 112 receives the login request and identifying information from the login program 142, password management program 112 determines a password to use, selects the associated password key, or combination of password keys, from the password inventory for the specific user, and sends the password key to the login program 142, which is then communicated to the user to be authenticated. For example, in instances where the password key is a color, the login program 142 may change the text font to correspond to the password key, in order to communicate the password key to the user to be authenticated. Selecting the password may be based on user defined criterion contained in user preferences 114, such as a password cannot be reused, or that a password cannot be reused for a specified period of time. In an example embodiment, password management program 112 only selects passwords that have not previously been entered by the user to be authenticated (as discussed below), and does not select dummy passwords located in the password list.

Referring to step S240, password management program 112 receives an entered password from the login program 142. Once login program 142 receives the selected password key, it prompts the user to be authenticated with the selected password key. The user to be authenticated (if they are the specific user) may look at the password inventory that was sent in step S210, and enter the password from the password inventory that corresponds to the password key. For example, if the secure user device 130 received the password inventory in FIG. 4b, and the user to be authenticated is prompted to enter the password corresponding to password key g, then the valid password would be defgh4567. In another example, if the secure user device 130 received the password inventory in FIG. 4e, and the user to be authenticated is prompted to enter the password corresponding to password key 264, then the valid password would be f4&v9015k (a combination of keys 2, 6 and 4, in order). As stated above, login program 142 receives a password from the user of third party device 140 via a provided user interface. Login program 142 then transfers the received password to password management program 112 via network 130. Additionally, password management program 112 logs the specific password that was entered.

Referring to step S250, password management program 112 determines if the entered password matches the password based on the selected password key. Specifically, password management program 112 matches the entered password to the password corresponding to the password key that was previously sent to the login program 142, where password management program 112 references the password inventory to match the entered password with the associated password key or password keys. If the password matches, password management program 112 proceeds to step S255. If the password does not match, password management program 112 proceeds to step S260.

Referring to step S255, send acknowledgement of successful password entry to login program 142, and the user to be authenticated is now an authenticated user (authenticated as the specific user). Login program 142 would then grant the authenticated user access to the secure information, services or applications located on third party device 140 that are associated with the specific user. Following step S255, the specific user may utilize the password management program 112 at step S220 in order to attempt additional logins with the same password inventory.

Referring to step S260, password management program 112 determines if the entered password matches any password from the password inventory. If the entered password matches a password from the password inventory, password management program proceeds to step S270. If the password does not match a password from the password inventory, password management program 112 proceeds to step S262.

Referring to step S262, password management program 112 increases an error counter, reflecting the number of times a password has been entered that does not match any password in the password inventory, and password management program 112 then determines if the error counter exceeds a threshold value. The threshold value may be a setting contained in the user preferences 114 detailing the number of incorrect passwords, which in this scenario may result from a mistyped password. If the threshold value is exceeded, password management program 112 proceeds to step S285. If the threshold value is not exceeded, password management program 112 proceeds to step S265.

Referring to step S265, password management system 112 sends a request to login program 142 to prompt the user to enter a password. In an embodiment, the prompt may ask the user to re-enter the password corresponding to the password key that was sent in step S230. In another embodiment, the request may include a new password key, and the prompt may ask for the password corresponding to the new password key. Following step S265, password management program 112 returns to step S240.

Referring to step S270, password management program 112 determines if the password received in step S240 matches any "hot" passwords. A "hot" password may be any password that would signal that there was an unauthorized attempt to access the secure information, services or programs located on the third party device 140 from someone that is not the specific user. In an embodiment, a "hot" password may be a password from the password inventory that has previously been used to login into a third party device 140, which may have been logged during step S240. In another embodiment, a "hot" password may be any dummy password located in the password inventory. In a different embodiment, a "hot" password may be any password that corresponds to a false cue from the password key. For example if in FIG. 4c fghij6789 is entered for a prompt with a password key of "f", then the password may be "hot," as an unauthorized user may guess a password that contains the letter "f" based on the password key. In another embodiment, the password may be any password from the password list. If password management program 112 determines that the password is not "hot" then the password management program 112 proceeds to step S272. If password management program 112 determines that the password is "hot," then the user to be authenticated is now considered an unauthorized user and password management program 112 proceeds to step S280.

Referring to step S280, password management system 112 takes action based on the entrance of the "hot" password, such as initiating protocols corresponding to an unauthorized attempt to access secure information, programs or services. Following the entrance of the "hot" password the specific user is notified that an unauthorized attempt was made, and multiple subsequent actions may be taken by the password management program 112. In an example embodiment, an unauthorized user that entered the "hot" password would be granted access to a honey pot system that appears to grant access to the unauthorized user, but is to track actions and possibly identify and apprehend the unauthorized user. In another example embodiment, credentials of the specific user may be locked, such that the user to be authenticated would not be granted access via password management program 112 until the specific user resets the password system using alternative means. In another embodiment, the user device 120 attempting to access the secure information, services or programs is locked from gaining access via password management program 112. In an embodiment where the passwords are user created, the "hot" password would be removed from the password inventory, as the "hot" password may be compromised. Following the initiation of any number of the above listed protocols, the password management program 112 returns to step S215 to reissue the password keys.

Referring to step S272, password management program 112 increases the non-hot counter, reflecting the number of times a password from the password list has been incorrectly entered (while not being "hot), and password management program 112 then determines if the non-hot counter exceeds a threshold value. The threshold value may be a setting contained in the user preferences 114 detailing the number of incorrect passwords that are allowed. If the threshold value is exceeded, password management program 112 proceeds to step S285 (or step S280, depending on user preferences 114). If the threshold value is not exceeded, password management program 112 proceeds to step S230.

Referring to step S285, the password management program 112 takes action based on exceeding either counter. Following the exceeding of the counter, the specific user may be notified that an unauthorized password was used, and subsequent action may be taken by password management program 112. In an example embodiment, password management program 112 may return to step S210 by reissuing another password inventory, and restarting the user authentication process. In another example embodiment, credentials of the user to be authenticated may be locked, such that the user to be authenticated would not be granted access via password management program 112 until the user to be authenticated is authenticated through alternative means. In another embodiment, the user device 120 attempting to access the secure information, services or programs is locked from gaining access via password management program 112.

The flowchart illustrated in FIG. 2a and FIG. 2b represents an example path for password management program 112. However, each block in the diagram does not need to be accessed only from the previous block. For example, following a successful entrance of a program, the specific user may attempt additional logins using the password vault from step S210 or step S215.

Figure 3:
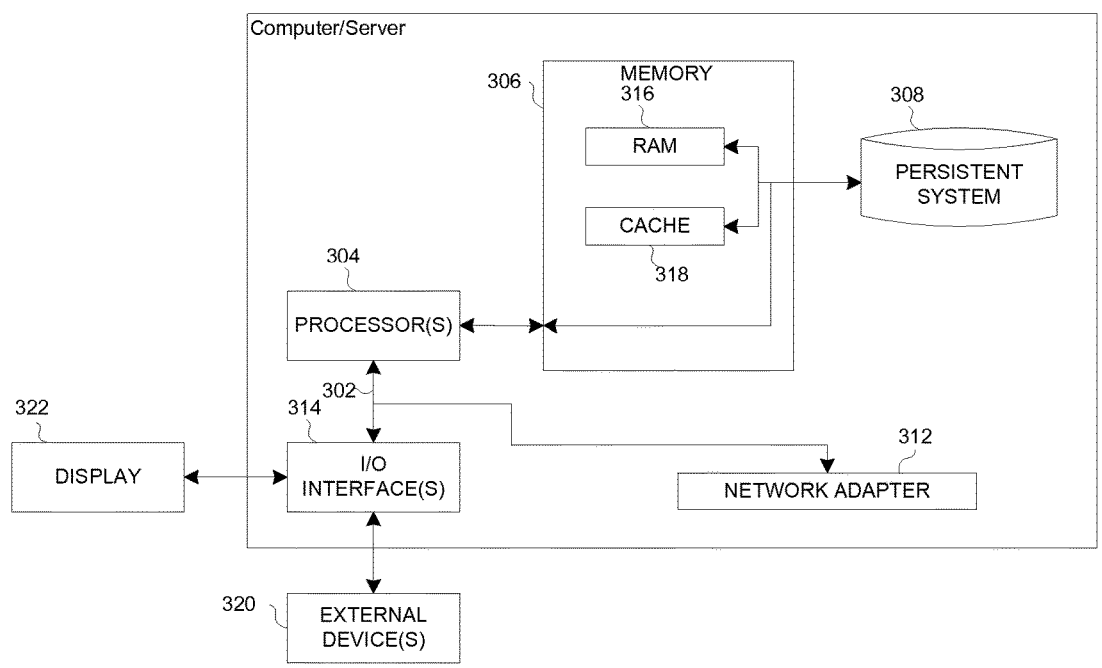
FIG. 3 is a block diagram depicting the hardware components of the password management system of FIG. 1, in accordance with an embodiment of the invention.

FIG. 3 depicts a block diagram of components of password management device 110, user device 120, secure user device 130 and third party device 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Password management device 110, user device 120, secure user device 130 and third party device 140 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs password management program 112 and user preferences 114 in password management device 110; user interface 122 in user device 120; password dissemination program 132 in secure user device 130; and login program 142 in third party device 140 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The programs password management program 112 and user preferences 114 in password management device 110; user interface 122 in user device 120; password dissemination program 132 in secure user device 130; and login program 142 in third party device 140 may be downloaded to persistent storage 308 through communications unit 312.

I/O interface(s) 314 allows for input and output of data with other devices that may be connected to password management device 110, user device 120, secure user device 130 and third party device 140. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., the programs password management program 112 and user preferences 114 in password management device 110; user interface 122 in user device 120; password dissemination program 132 in secure user device 130; and login program 142 in third party device 140, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method authenticating a user, the method comprising:
   creating a password inventory, wherein the password inventory comprises a list of one or more passwords, wherein each of the one or more passwords corresponds to a password key;
   updating the password inventory without input from a user, wherein updating the password inventory comprises one or more of:
      sending a new list of password keys, wherein each password key corresponds to each password; and
      sending a new list of passwords, wherein each password corresponds to each password key;
   receiving a first login request from a first device;
   transmitting information detailing a first password key to the first device, wherein the first password key corresponds to a first password from the list of one or more passwords, and wherein the first password key is selected regardless of the order of the list of one or more passwords;
   receiving information detailing a first entered password from the first device; and
   determining whether the first entered password is identical to the first password from the list of one or more passwords.

2. The method of claim 1, wherein the list of more than one password comprises one or more dummy passwords, and the method further comprising:
 based on determining that the first entered password is not identical to the first password from the list of one or more passwords, determining that the first entered password is identical to a dummy password from the list of one or more passwords; and
 initiating protocols corresponding to an unauthorized login attempt.

3. The method of claim 2, wherein initiating protocols corresponding to an unauthorized login attempt further comprises:
 updating the password inventory; and
 transmitting information detailing a portion of the password inventory to a third device, wherein the user has access to the third device.

4. The method of claim 1, further comprising based on updating the password inventory transmitting information detailing a portion of the password inventory to a third device, wherein the user has access to the third device.

5. The method of claim 1, further comprising:
 receiving a second login request from a second device;
 transmitting information detailing a second password key to the second device, wherein the second password key corresponds to a second password from the list of one or more passwords, and wherein the second password is not identical to first password from the list of one or more passwords;
 receiving a second entered password from the second device; and
 determining whether the second entered password is identical to the second password from the list of one or more passwords.

6. The method of claim 5, further comprising:
 based on determining that the second entered password is not identical to the second password from the list of one or more passwords, determining that the second entered password is identical to the first password; and
 initiating protocols corresponding to an unauthorized login attempt.

7. The method of claim 1, further comprising:
 determining that the first entered password is identical to a first password corresponding to the first password key; and
 authenticating the user.

8. A computer program product for authenticating a user, the computer program product comprising:
 one or more computer-readable storage devices and program instructions stored on at least one of the one or more tangible storage devices, the program instructions comprising:
 program instructions to create a password inventory, wherein the password inventory comprises a list of one or more passwords, wherein each of the one or more passwords corresponds to a password key;
 program instructions to update the password inventory without input from a user, wherein updating the password inventory comprises one or more of:
 sending a new list of password keys, wherein each password key corresponds to each password; and
 sending a new list of passwords, wherein each password corresponds to each password key;
 program instructions to receive a first login request from a first device;
 program instructions to transmit information detailing a first password key to the first device, wherein the first password key corresponds to a first password from the list of one or more passwords, and wherein the first password key is selected regardless of the order of the list of one or more passwords;
 program instructions to receive information detailing a first entered password from the first device; and
 program instructions to determine whether the first entered password is identical to the first password from the list of one or more passwords.

9. The computer program product of claim 8, wherein the list of more than one password comprises one or more dummy passwords, and the computer program product further comprising:
 based on determining that the first entered password is not identical to the first password from the list of one or more passwords, program instructions to determine that the first entered password is identical to a dummy password from the list of one or more passwords; and
 program instructions to initiate protocols corresponding to an unauthorized login attempt.

10. The computer program product of claim 9, wherein the program instructions to initiate protocols corresponding to an unauthorized login attempt further comprises:
 program instructions to update the password inventory; and
 program instructions to transmit information detailing a portion of the password inventory to a third device, wherein the user has access to the third device.

11. The computer program product of claim 8, further comprising based on updating the password inventory, program instructions to transmit information detailing a portion of the password inventory to a third device, wherein the user has access to the third device.

12. The computer program product of claim 8, further comprising:
 program instructions to receive a second login request from a second device;
 program instructions to transmit information detailing a second password key to the second device, wherein the second password key corresponds to a second password from the list of one or more passwords, and wherein the second password is not identical to first password from the list of one or more passwords;
 program instructions to receive a second entered password from the second device; and
 program instructions to determine whether the second entered password is identical to the second password from the list of one or more passwords.

13. The computer program product of claim 12, further comprising:
 based on determining that the second entered password is not identical to the second password from the list of one or more passwords, program instructions to determine that the second entered password is identical to the first password; and
 program instructions to initiate protocols corresponding to an unauthorized login attempt.

14. The computer program product of claim 8, further comprising:
 program instructions to determine that the first entered password is identical to a first password corresponding to the first password key; and
 program instructions to authenticate the user.

15. A computer system for authenticating a user, the computer system comprising:
 one or more processors, one or more non-transitory computer-readable memories, one or more computer-readable tangible storage devices, and program instructions stored on at least one of the one or more storage devices for execution by at least one of the one or more processors via at least one of the one or more memories, the program instructions comprising:
program instructions to create a password inventory, wherein the password inventory comprises a list of one or more passwords, wherein each of the one or more passwords corresponds to a password key;
program instructions to update the password inventory without input from a user, wherein updating the password inventory comprises one or more of:
sending a new list of password keys, wherein each password key corresponds to each password; and
sending a new list of passwords, wherein each password corresponds to each password key;
program instructions to receive a first login request from a first device;
program instructions to transmit information detailing a first password key to the first device, wherein the first password key corresponds to a first password from the list of one or more passwords, and wherein the first password key is selected regardless of the order of the list of one or more passwords;
program instructions to receive information detailing a first entered password from the first device; and
program instructions to determine whether the first entered password is identical to the first password from the list of one or more passwords.

16. The computer system of claim 15, wherein the list of more than one password comprises one or more dummy passwords, and the computer program product further comprising:
based on determining that the first entered password is not identical to the first password from the list of one or more passwords, program instructions to determine that the first entered password is identical to a dummy password from the list of one or more passwords; and
program instructions to initiate protocols corresponding to an unauthorized login attempt.

17. The computer system of claim 16, wherein the program instructions to initiate protocols corresponding to an unauthorized login attempt further comprises:
program instructions to update the password inventory; and
program instructions to transmit information detailing a portion of the password inventory to a third device, wherein the user has access to the third device.

18. The computer system of claim 15, further comprising based on updating the password inventory program instructions to transmit information detailing a portion of the password inventory to a third device, wherein the user has access to the third device.

19. The computer system of claim 15, further comprising:
program instructions to receive a second login request from a second device;
program instructions to transmit information detailing a second password key to the second device, wherein the second password key corresponds to a second password from the list of one or more passwords, and wherein the second password is not identical to first password from the list of one or more passwords;
program instructions to receive a second entered password from the second device; and
program instructions to determine whether the second entered password is identical to the second password from the list of one or more passwords.

20. The computer system of claim 19, further comprising:
based on determining that the second entered password is not identical to the second password from the list of one or more passwords, program instructions to determine that the second entered password is identical to the first password; and
program instructions to initiate protocols corresponding to an unauthorized login attempt.

* * * * *